T. J. DUDLEY.
DRAFT APPLIANCE.
APPLICATION FILED MAR. 22, 1909.
949,525.
Patented Feb. 15, 1910.
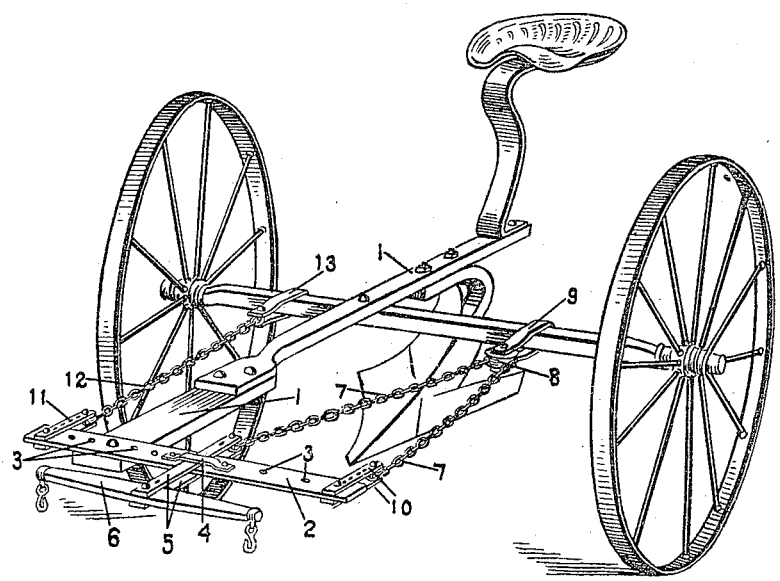
WITNESSES:
John S. Murray
G. B. Coulson
INVENTOR
Thomas J. Dudley
BY John W. Spellman
ATTORNEY

UNITED STATES PATENT OFFICE.

THOMAS J. DUDLEY, OF ABILENE, TEXAS, ASSIGNOR TO DUDLEY IMPLEMENT & MANUFACTURING COMPANY, OF ABILENE, TEXAS.

DRAFT APPLIANCE.

949,525.

Specification of Letters Patent.   Patented Feb. 15, 1910.

Application filed March 22, 1909. Serial No. 485,139.

*To all whom it may concern:*

Be it known that I, THOMAS J. DUDLEY, a citizen of the United States, residing at Abilene, in the county of Taylor and State of Texas, have invented certain new and useful Improvements in Draft Appliances, of which the following is a specification.

My invention relates to new and useful improvements in draft appliances. Its object is to provide a draft appliance attachable to plows, mowers, and other farm implements whereby the horse power may be applied at any of a plurality of points in a line transverse with the implement, without throwing the implement out of alinement in the direction of travel of the implement.

Another object is to provide a draft appliance, which when attached to a plow, or mower, will enable the horses to travel at one side of the center of the machine, thus enabling the horses to avoid the plowed ground, or the uncut grain.

Finally, the object of the invention is to provide a device of the character described which will be strong, durable, simple and efficient, and comparatively easy to construct, and also one in which the various parts will not be likely to get out of working order.

With these and other objects in view, my invention has relation to certain novel features of construction and operation, an example of which is described in the following specification and illustrated in the accompanying drawing, which is a perspective view of the equalizer applied to a plow as seen from the front right-hand side thereof.

Numeral 1 in the drawing denotes the beam of the plow at the front extremity of which is adjustably mounted the cross bar 2. At intervals along this cross bar, additional bolt holes 3 are placed to allow adjustment in the connection of the cross bar to the plow beam and to permit adjustment of the arched bar 4, which is mounted upon said cross bar. Upon the cross bar 2, is slidably mounted a pair of links 5, which are guided and restrained from transverse displacement by said arched bar 4. At the front extremity of said links 5, is pivotally mounted a double tree 6. At the rear extremity of said links 5 is attached the chain 7, which encircles the pulley or roller 8 which is rotatably mounted on a vertical pivot in an adjustable bearing 9, upon the axle. The other extremity of the chain 7 is attached between a pair of straps 10 pivotally mounted at one extremity of the cross bar 2. The working length of said straps 10 may be adjusted by placing the bolt which attaches said straps to cross bar 2 in any one of a number of bolt holes distributed along said straps 10. At the other extremity of said cross bar 2, is pivotally mounted a pair of straps 11, similar to the straps 10, and carrying a similar plurality of bolt holes for the purpose of adjustment. At the rear extremity of said straps 11, is attached a chain 12, the other extremity of which is attached to a bearing 13, similar to the bearing 9, and similarly adjustable along the axle.

The cross bar 2 is mounted far enough in front of the axle, so that the angle between the chains 7 and 12 and the axle will not be sufficiently acute to cause transverse displacement of the adjustable devices 9 and 13, when the chains are put under strain. Thus it is unnecessary to provide set screws or similar means for holding said devices in adjustment.

When a tension is applied to the links 5, it is transmitted to the chain 7, producing a forward pull upon the axle at 9, and a backward pull upon the pivotally mounted cross-bar 2 at 10. This backward pull at 10 produces a corresponding forward pull at 11 which is transmitted by the chain 12 to the axle at 13. Thus the pull of the horses may be applied where desired upon cross-bar 2 by adjusting the arch-bar 4 thereupon, provided the members 9 and 13 and the cross-bar 2 are properly adjusted to counteract the tendency to throw the vehicle out of alinement.

I am aware that changes may be made in the form and proportion of parts and details of construction of the device herein described as a preferable embodiment of my invention, without departing from the spirit or sacrificing the advantages thereof, and I therefore reserve the right to make such changes and alterations in said device as fairly come within its scope.

What I claim is:

1. In a draft appliance, the combination with a cross bar, transversely attached to the frame of a farm implement, of a flexible connection between one end of said cross bar and the axle of the implement, adjustably attached to said axle, adjustable means mounted upon said axle, to which said flexible connection is attached, an adjustable bearing mounted upon said axle to support a roller or pulley, a roller or pulley rotatably mounted in said adjustable bearing, a flexible connection, attached to the other extremity of said cross bar, and passing around said roller or pulley, whose other extremity is attached to a link or links, slidably mounted upon said cross bar 2, and restrained from transverse motion thereon, means for restraining said link or links from transverse motion upon said cross bar, and means attached to the front of said link or links, whereby horses may be attached.

2. In a draft appliance, the combination with a farm implement, of a cross bar adjustably mounted upon the frame of said implement, means for adjusting said cross bar upon said frame, a link or links longitudinal with said farm implement, slidably mounted upon said cross bar, and restricted from transverse motion, an arched bar mounted upon said cross bar, and restricting said link or links from transverse motion, means for adjusting said arched bar upon said cross bar, a swingle or double tree, pivotally mounted at the front end of said link or links, means adjustable upon the axle, carrying a rotatably mounted pulley or roller, a rope or chain attached at rear end of said link or links, passing through said roller or pulley, and having its other extremity adjustably attached to one end of said cross bar, means of adjustable length, whereby said rope or chain is attached to the end of said cross bar, a rope or chain connecting the other end of said cross bar to the axle, means adjustable upon the axle, to which said rope or chain is attached, and means of adjustable length, whereby said rope or chain is connected to said cross bar.

3. In a draft appliance, the combination with a farm implement, of a front cross bar, pivotally mounted upon the front of the frame of said implement, of a middle cross bar, rigidly mounted in the middle of the frame of said implement, a flexible connection between one end of front cross bar and one side of middle cross bar, adjustably attached to said middle cross bar, a flexible connection between other end of front cross bar and other side of middle cross bar, moving freely in its adjustable connection to middle cross bar and continuing therefrom to the middle part of front cross bar, an adjustable attachment upon the middle cross bar, permitting said adjustable connection to pass freely therethrough, and means attached to other extremity of said flexible connection and mounted in middle part of front cross bar, whereby the draft is transmitted to said flexible connection.

In testimony whereof I have signed my name to this specification in the presence of two subscribing witnesses.

THOMAS J. DUDLEY.

Witnesses:
 SAM. BUCKLEW,
 JESSIE KIRK.